(12) United States Patent
Zheng et al.

(10) Patent No.: US 6,368,150 B1
(45) Date of Patent: Apr. 9, 2002

(54) CONNECTOR ASSEMBLY

(75) Inventors: Qishen Zheng; Hongbin Zhou; Qijun Zhao, all of Kunsan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/751,495

(22) Filed: Dec. 29, 2000

(30) Foreign Application Priority Data

Oct. 31, 2000 (TW) .......................................... 89218879

(51) Int. Cl.⁷ .............................................. H01R 13/60
(52) U.S. Cl. ...................... 439/541.5; 385/55; 385/75
(58) Field of Search ............................. 439/541.5, 63, 439/79; 385/55, 56, 75

(56) References Cited

U.S. PATENT DOCUMENTS

| | | | | |
|---|---|---|---|---|
| 5,570,443 A | * | 10/1996 | May et al. ..................... | 385/75 |
| 5,745,622 A | * | 4/1998 | Birnbaum et al. ............ | 385/75 |
| 5,755,592 A | * | 5/1998 | Hillbish et al. .......... | 439/541.5 |
| 6,033,125 A | * | 3/2000 | Stillie et al. ................... | 385/75 |
| 6,142,802 A | * | 11/2000 | Berg et al. ..................... | 385/75 |
| 6,168,462 B1 | * | 1/2001 | Liao ........................ | 439/541.5 |

* cited by examiner

*Primary Examiner*—Gary Paumen
(74) *Attorney, Agent, or Firm*—Wei Te Chung

(57) ABSTRACT

A connector assembly (1) includes an insulative cover (10), an optical fiber connector (11), an electrical connector (12) and a dielectric frame (13). The cover defines a first receiving cavity (101) receiving the optical fiber connector therein and a second receiving cavity (105) receiving the electrical connector. The frame is assembled to the cover and the electrical connector. The optical fiber connector includes a plurality of terminals extending through the frame. The connector assembly compactly and efficiently combines the optical fiber connector and the electrical connector into one package.

1 Claim, 5 Drawing Sheets

US 6,368,150 B1

CONNECTOR ASSEMBLY

BACKGROUND OF THE INVENTION

1. Field of the Invention

The present invention relates to a connector assembly, and particularly to a connector assembly comprising an optical fiber connector and an electrical connector.

2. Description of the Prior Art

Conventional signal transmission is achieved using electrical wires, which requires electrical connectors for use in wire interconnection. Following the development of high speed, large volume and long distance signal transmission, optical fiber connectors were developed to meet evolving requirements. In some situations, a combination of electrical and optical fiber connectors is necessary. A combination electrical/optical fiber connector in a mechanically secure and dimensionally compact package is required to meet the current trend toward miniaturization in information processing devices.

SUMMARY OF THE INVENTION

An object of the present invention is to provide a connector assembly consisting of an optical fiber connector and an electrical connector which are reliably assembled together in a compact manner.

A connector assembly according to the present invention comprises an insulative cover, an optical fiber connector, an electrical connector and a dielectric frame. The cover defines first and second receiving cavities to receive the optical fiber connector and the electrical connector therein, respectively. The frame is assembled to the cover and the electrical connector and receives terminals extending from the optical fiber connector.

Other objects, advantages and novel features of the invention will become more apparent from the following detailed description of the present embodiment when taken in conjunction with the accompanying drawings.

DETAILED DESCRIPTION OF THE INVENTION

Figure 1:
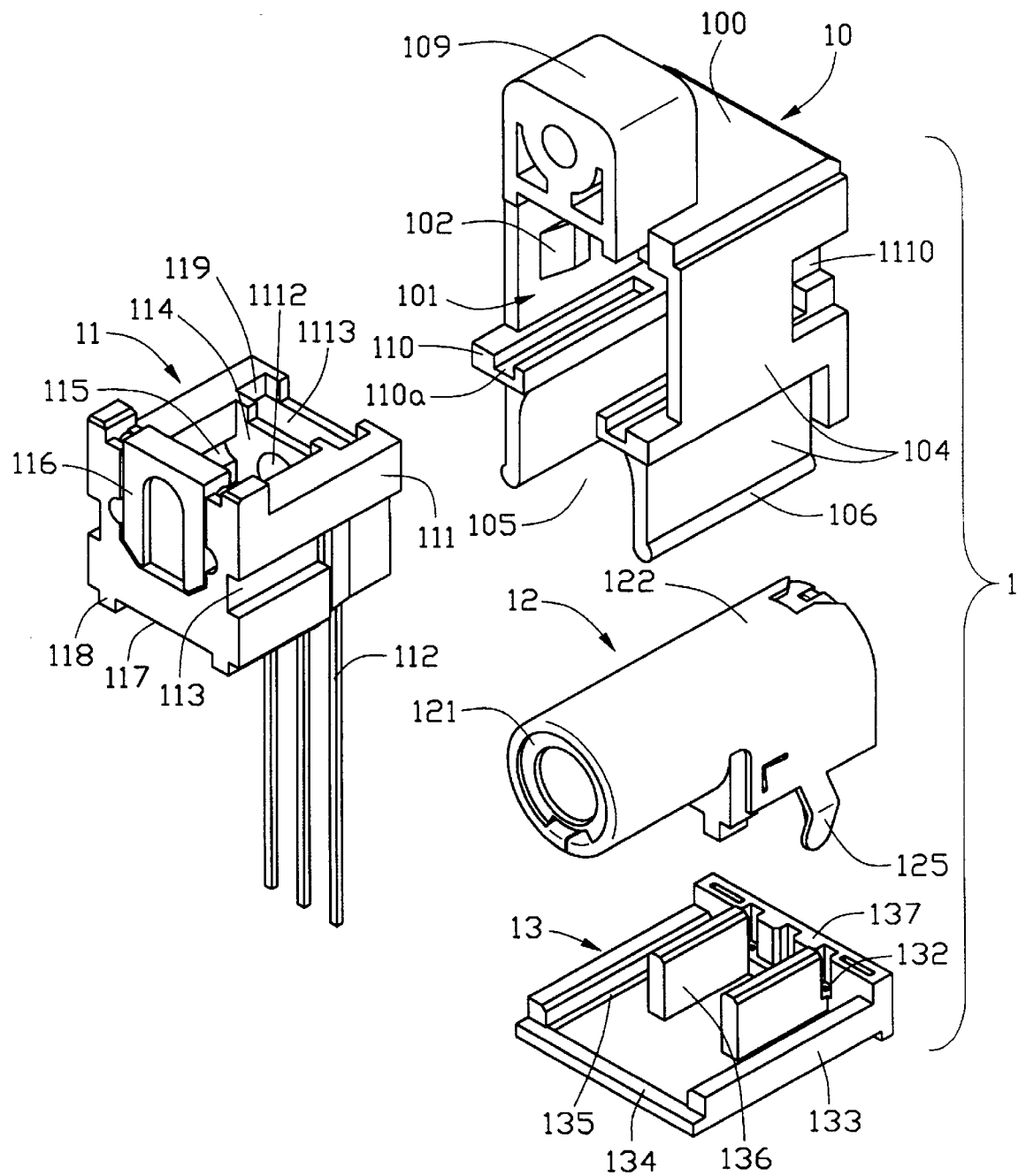
FIG. 1 is an exploded view of a connector assembly in accordance with the present invention.
Figure 2:
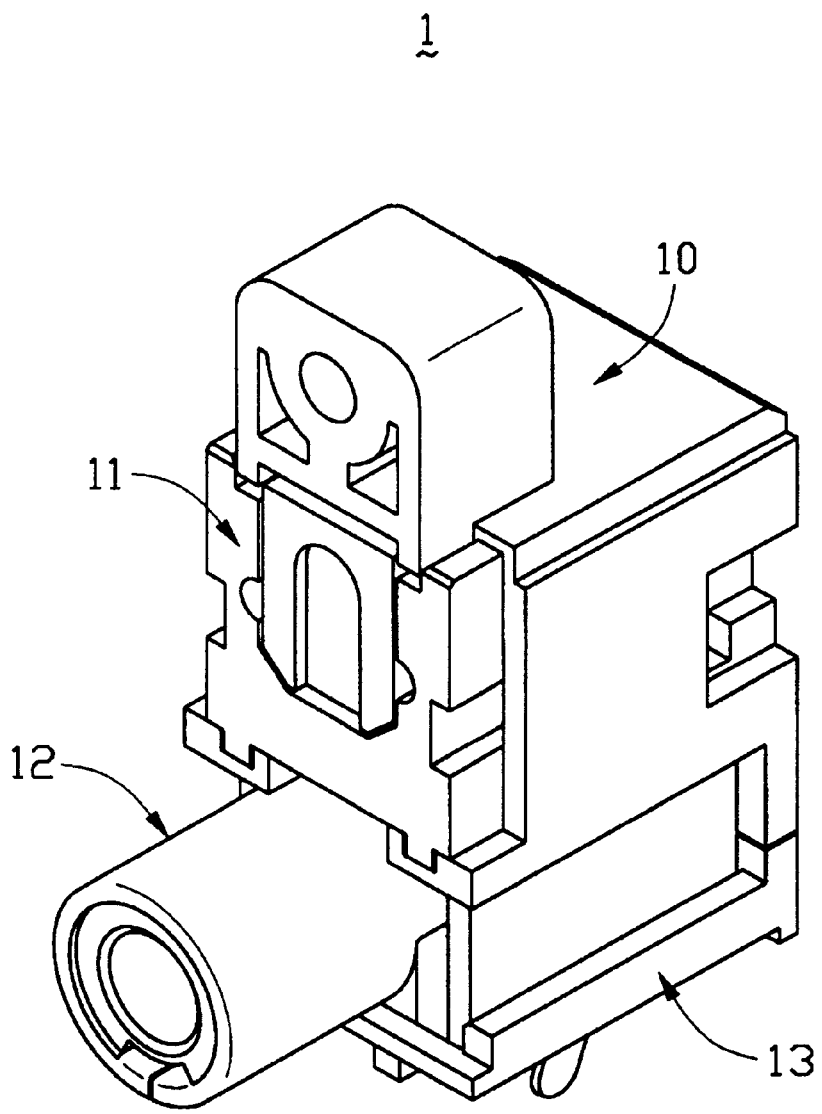
FIG. 2 is an assembled perspective view of the connector assembly of FIG. 1.

Referring to FIG. 1, a connector assembly 1 in accordance with the present invention comprises an insulative cover 10, an optical fiber connector 11, an electrical connector 12 and a dielectric frame 13.

Figure 3:
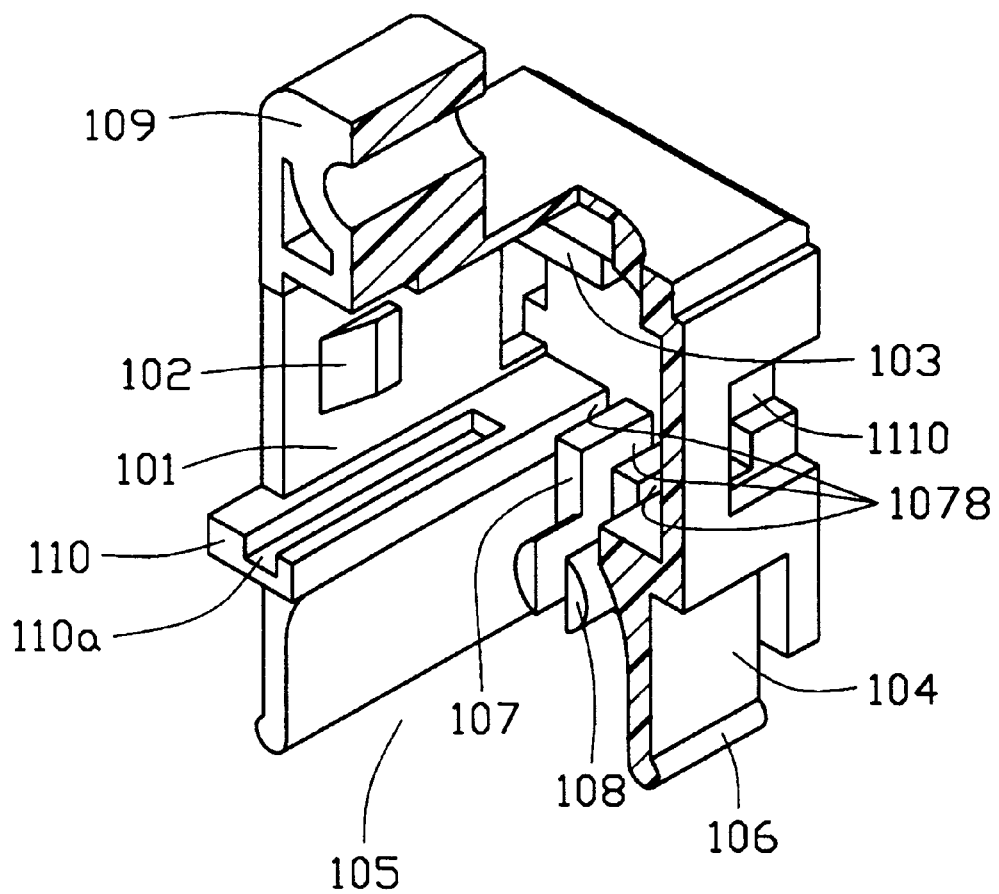
FIG. 3 is a partially cutaway view of an insulative cover of the connector assembly of FIG. 1.

The cover 10 comprises a top wall 100, a pair of side walls 104 and a rear wall 1110. The cover 10 is open at a bottom and front thereof. An ear 109 extends upwardly from a front side of the top wall 100. The top wall 100 of the cover 10 further forms a top block 103 (best seen in FIG. 3) extending downwardly from a rear side of an inner face thereof into a first receiving cavity 101 in an upper portion of the cover 10. The cover 10 further defines a second receiving cavity 105 located below and communicating with the first receiving cavity 101. A pair of supporting ribs 110 are formed on inside surfaces of the side walls 104, respectively, and are located between the first and second receiving cavities 101, 105. Each supporting rib 110 defines a guiding groove 110a therein open to a front thereof. Each side wall 104 forms a protrusion 102 in the first receiving cavity 101 and a foot 106 extending from a bottom edge thereof. A pair of stopping blocks 107 are formed on an inner face of the rear wall 1110 protruding into the second receiving cavity 105 and an insert 108 projects forwardly from a lower portion of each stopping block 107. A top surface of each supporting rib 110 is flush with a top surface of each stopping block 107 and the supporting ribs 110 and the stopping blocks 107 define three gaps 1078 therebetween (best seen in FIG. 3). Each insert 108 has a semicircular configuration.

The optical fiber connector 11 comprises a dielectric housing 111 and three terminals or connecting pieces 112 depending downwardly from the dielectric housing 111. The dielectric housing 111 defines a pair of recesses 113 in opposite outer side surfaces thereof and a plug receiving space 114 therein. A pair of slots 115 (only one shown) are defined in opposite inner side surfaces of the housing 111 and in communication with the plug receiving cavity 114. A light emitting element 1113 is mounted in a rear wall of the housing 111 and comprises a contact portion 1112 exposed to the plug receiving cavity 114. The housing 111 further defines an upper recess 119 above a top of the light emitting element 1113 in the rear wall thereof. A dustproof door 116 is pivotally mounted in a way ordinary in the pertinent art on a front side of the housing 111. The door 116 is pushed rearward and upward when a complementary plug connector (not shown) is inserted along the slots 115 into the plug receiving space 114 to contact the contact portion 1112, and returns back to its initial position when the complementary plug connector is disengaged from the optical fiber connector 11. The connection mechanism of the light emitting element 1113, the complementary plug connector and the terminals 112 are commonly known to one skilled in the pertinent art, so detailed descriptions thereof are omitted herein. A pair of guiding ribs 118 protrude from a bottom surface 117 of the housing 111.

Figure 4:
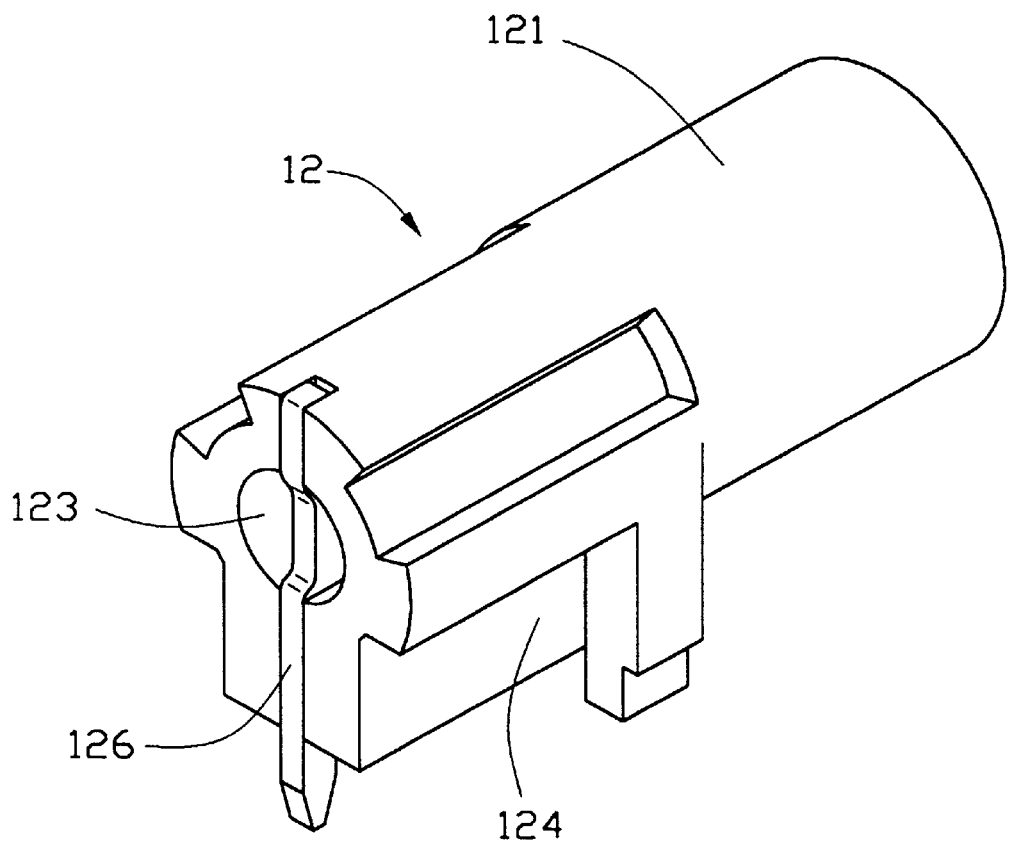
FIG. 4 is a rear perspective view of an electrical connector of the connector assembly of FIG. 1 with a shield thereof removed.
Figure 5:
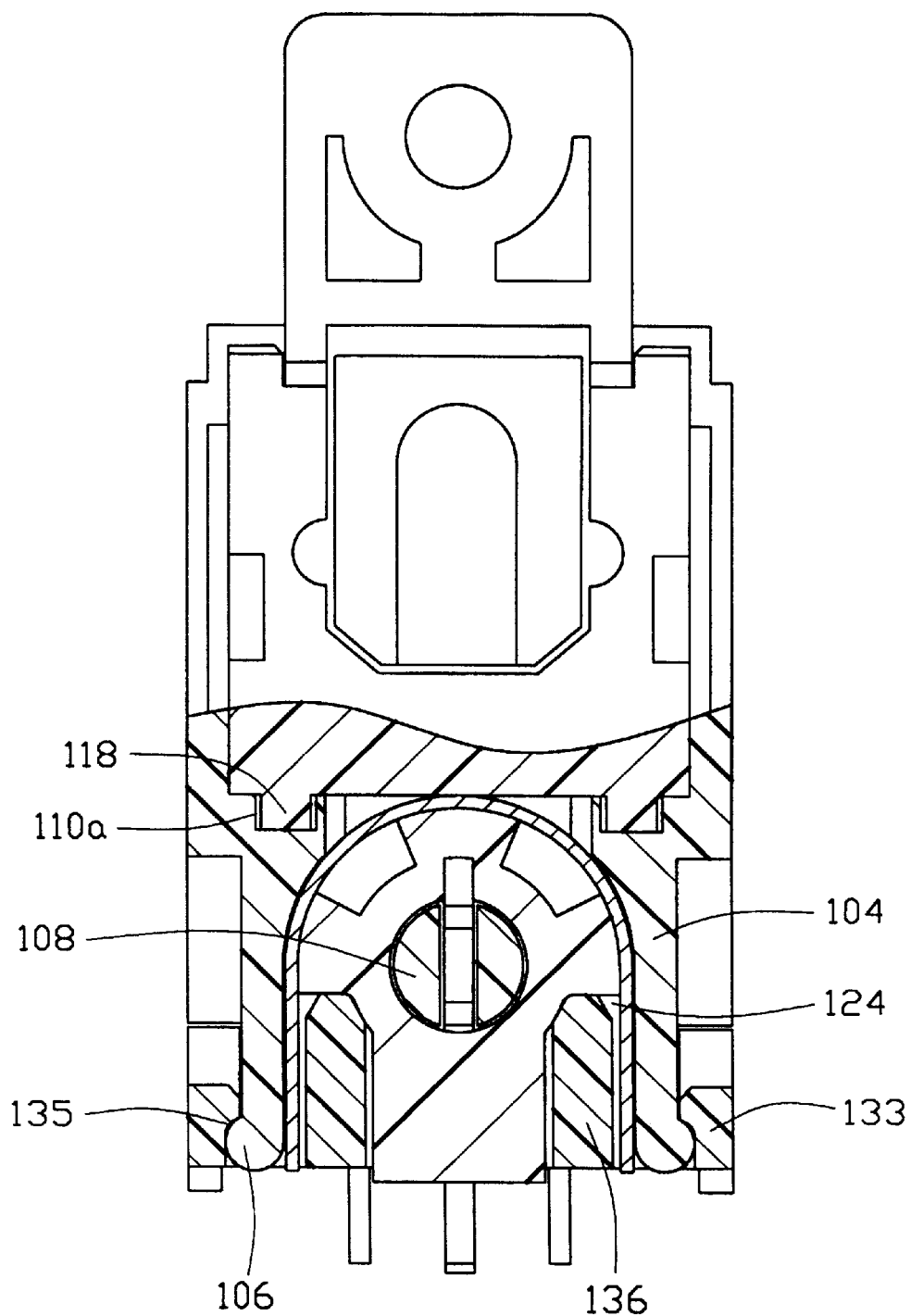
FIG. 5 is a front view of the connector assembly partially cut away.

Also referring to FIG. 4, the electrical connector 12 comprises an insulative housing 121, an electrical terminal 126 mounted in the insulative housing 121 and a conductive shield 122 enclosing the housing 121 and the electrical terminal 126. The housing 121 defines a through hole 123 extending therethrough. A rear end portion of the through hole 123 in the housing 121 is divided by the terminal 126 into two halves. The housing 121 defines a pair of opposite recessed sections 124 on an outer, rear, lower portion thereof. The shield 122 comprises a pair of grounding tabs 125 projecting downwardly from a bottom edge thereof.

The frame 13 is hollow and has a substantially rectangular configuration, and comprises a pair of lateral sides 133, a front side 134 and a rear side 137. The lateral sides 133 are higher than the front side 134 and are lower than the rear side 137. The lateral sides 133 each define a retention portion 135 in an inner face thereof. A plurality of terminal holes 132 are defined through a lower portion of the rear side 137 and a pair of spacing plates 136 extend forwardly from the rear side 137.

In assembly, the optical fiber connector 11 is inserted into the first receiving cavity 101. The guiding ribs 118 slide in the guiding grooves 110a until the protrusions 102 are engaged in the recesses 113. The top block 103 is received in the upper recess 119. The terminals 112 depend downwardly through the gaps 1078, respectively, and are thus insulatively separated from each other. A rear portion of the electrical connector 12 is received in the second receiving cavity 105 by extending the inserts 108 into the two halves of the rear portions of the through hole 123 until the stopping blocks 107 abut against a rear face of the housing 121 of the electrical connector 12. The frame 13 is finally assembled to the subassembly of the cover 10, the optical fiber connector 11 and the electrical connector 12. In the assembling, the spacing plates 136 extend into the recessed sections 124 of the housing 121 and the feet 106 are reliably retained by the retention portions 135. The terminals 112 extend through the terminal holes 132 of the frame 13 to a position beyond a bottom of the frame 13. The grounding tabs 125, the electrical terminal 126 and the terminals 112 all extend beyond the bottom of the frame 13.

From the above disclosures, the present invention provides a very compact and secure structure for combining an electrical connector and an optical fiber connector together, thereby meeting the innovative requirements of current information technology.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A connector assembly comprising:

an insulative cover comprising a top wall, a rear wall and a pair of side walls, the top wall, the rear wall and the pair of side walls defining first and second receiving cavities therebetween, the rear wall forming a pair of inserts extending into the second receiving cavity, the side walls each forming a supporting rib thereon between the first and second receiving cavities;

an optical fiber connector received in the first receiving cavity and supported by the supporting ribs, the optical fiber connector comprising an insulative housing and a plurality of terminals accommodated in the insulative housing; and an electrical connector received in the second receiving cavity, the electrical connector comprising an electrical terminal, a dielectric housing defining a through hole, a rear portion of the through hole being divided by the electrical terminal into two halves to receive the inserts of the rear wall of the cover, and a conductive shield enclosing the dielectric housing and the electrical terminal:

further comprising a dielectric frame assembled to the cover, the optical fiber connector and the electrical connector;

wherein the top wall of the cover forms a top block depending downwardly therefrom and the housing of the optical fiber connector defines a recess for receiving the top block;

wherein each supporting rib defines a guiding groove therein and the housing of the optical fiber connector forms a pair of guiding ribs received in the guiding grooves;

wherein each side wall of the cover forms a protrusion thereon extending into the first receiving cavity and the housing of the optical fiber connector defines a pair of recesses engaging with the protrusions;

further comprising a dielectric frame comprising a pair of lateral sides and a rear side connecting the lateral sides;

wherein the rear side of the frame defines a plurality of terminal holes receiving the terminals of the optical fiber connector therethrough;

wherein the rear side of the frame forms a pair of spacing plates extending forwardly therefrom, and the housing of the electrical connector defines a pair of recessed sections engaging with the spacing plates;

wherein each lateral side of the frame defines a retention portion and each side wall of the cover forms a foot thereon secured by the retention portion of a corresponding lateral side of the frame.

* * * * *